US007565325B2

(12) United States Patent
Lenard et al.

(10) Patent No.: US 7,565,325 B2
(45) Date of Patent: Jul. 21, 2009

(54) MULTI-SITE SOFTWARE LICENSE BALANCING

(75) Inventors: Rohan Lenard, Hunters Hill (AU);
Julian J. Orbach, Macquarie Park (AU);
Martin Smyrk, Wollstonecraft (AU)

(73) Assignee: Avaya Technology Corp., Basking Ridge, NJ (US)

( * ) Notice: Subject to any disclaimer, the term of this patent is extended or adjusted under 35 U.S.C. 154(b) by 1462 days.

(21) Appl. No.: 10/191,082

(22) Filed: Jul. 9, 2002

(65) Prior Publication Data

US 2004/0010471 A1 Jan. 15, 2004

(51) Int. Cl.
*H04K 1/00* (2006.01)
(52) U.S. Cl. .............................. 705/59; 726/1
(58) Field of Classification Search ............. 705/50–59; 713/155–168, 182–185; 380/201–203; 726/1–36
See application file for complete search history.

(56) References Cited

U.S. PATENT DOCUMENTS

| 4,937,863 | A | * | 6/1990 | Robert et al. ................ 710/200 |
| 5,023,907 | A | * | 6/1991 | Johnson et al. ............. 710/200 |
| 5,260,999 | A | * | 11/1993 | Wyman ........................ 705/59 |
| 5,579,222 | A | * | 11/1996 | Bains et al. .................. 717/167 |
| 5,671,412 | A | * | 9/1997 | Christiano ................ 707/104.1 |
| 5,790,664 | A | * | 8/1998 | Coley et al. .................. 709/203 |
| 5,796,941 | A | * | 8/1998 | Lita ............................. 726/29 |
| 5,905,860 | A | * | 5/1999 | Olsen et al. .................... 726/27 |
| 6,574,612 | B1 | * | 6/2003 | Baratti et al. .................. 705/59 |
| 6,959,291 | B1 | * | 10/2005 | Armstrong et al. ............. 705/59 |
| 7,035,918 | B1 | * | 4/2006 | Redding et al. ............. 709/223 |
| 7,096,469 | B1 | * | 8/2006 | Kubala et al. ............... 718/100 |
| 2002/0169725 | A1 | * | 11/2002 | Eng ............................. 705/59 |

OTHER PUBLICATIONS

"RightNow Technologies and MarketFirst Partnership Delivers Complete E-Marketing Solution", PR Newsire, Aug. 14, 2001, p. 1.*
US 5,742,747, 04/1998, Hamadani, et al. (withdrawn)

* cited by examiner

*Primary Examiner*—Mary Cheung
(74) *Attorney, Agent, or Firm*—Patton Boggs LLP

(57) ABSTRACT

A multi-site software license balancing system for allocating a predetermined number of software licenses between two or more license servers located at different sites. Each license server compiles software license allocation and availability data and shares the allocation and availability data with the other license servers. When the number of allocated and available software licenses falls below a predetermined number and software licenses are available at an underutilized site, software licenses are transferred to the overutilized site, thus balancing the number of software licenses available at each site.

5 Claims, 5 Drawing Sheets

MULTI-SITE SOFTWARE LICENSE BALANCING

FIELD OF THE INVENTION

The invention relates to software licensing, and in particular to a system for controlling the number of users that concurrently use copies of a licensed application file.

PROBLEM

It is a problem in the software field to prevent unauthorized users from accessing and using an application file while also providing a method to allow customers to purchase and concurrently use more than one copy. A number of software publishers license software files under a pricing model wherein a customer purchases the right to concurrently use a predetermined number of copies. Software files that are sold for concurrent use are often delivered with license management software installed on a licensed server, from which the customer requests software licenses. The licensing management software ensures that the customer does not use more licenses than they have purchased and are entitled to use. A problem arises when a customer attempts to share use of the application files at more than one site.

Effective management of multiple copies of application files and "floating licenses" presents a major dilemma for computer site administrators and software application publishers. The focus of control for managing multiple copies of an application file or application file software license is the physical location of the application file or the program disk. The details of controlling physical access and the degree of inconvenience vary, but in a world of hard disks, networks, file servers and electronic email, management based on controlled distribution is intrinsically impractical or even impossible. Without any practical tools, site administrators are forced to rely on a rather ill defined "reasonable effort" at software license compliance. Three solutions have commonly been used.

The first solution has been to run the license management software at only one site and require users at other sites to request a software license across a wide-area-network (WAN) as described in U.S. Pat. No. 5,742,757. There are disadvantages to this approach. Application file usage requests across a WAN can be slow, and if the WAN connection goes down, some sites may be unable to request software licenses. A solution to the problem is to break the software licenses into sets and provide each site with its own license server, licensing management software and a set of software licenses. Using this solution, users at each site contact their local license server first. If the license server does not have a license available, the user is required to request a license from another server across the WAN. However, the user has no way of knowing which license server has a software license available. The problem is exasperated when additional sites are added, providing fewer software licenses at each site and additional sites to contact to request a software license.

A third solution, a licensing product named "KeyServer" from Sassafras Software of Hanover New Hampshire, solves the previously discussed problems by providing a system that allows "ghost servers". Ghost servers are placed at each site and handle software license requests from clients at those sites. Ghost servers obtain software licensees from a central license server. If a ghost server can not contact the central license server, the ghost server acts as the central license server. While this solution offers a very reliable system, a problem arises with enforcing licensing limits. When the central license server is not available to the ghost servers, each ghost server acts as the central license server, enabling each ghost server to allow access to the entire software license count at each and every site. Whether intentional or inadvertent, failure of the central license server provides a method for exceeding license limits.

For these reasons, a need exists for a system to track the number of software licenses allocated and available at each license server site and transfer software licenses from an underutilized license server to an over utilized license to balance software license distribution.

SOLUTION

The multi-site software license balancing system authorizes concurrent usage of an application files at multiple sites. Initially, a plurality of software licenses authorizing concurrent usage of a corresponding application file are divided among the multiple sites. A license server located at each site accepts application file requests from users at that particular site. If a software license is available when the request is received, the user is granted authorization to access and use the corresponding application file. The multiple license servers are interconnected via a WAN or other network connection. As concurrent usage is granted at each site, the multiple license servers record an application file usage statistic pertaining to the number of software licenses available at the particular site and the number of concurrent users authorized by the license server during a predetermined time period. Thus allowing each site to track the number of concurrent users authorized at each other site. When one of the multiple license servers is overutilized, receiving more application file usage requests than the license server has available, the license server requests software licenses from an underutilized license server, thus balancing the number of concurrent users authorized at each site based on usage. To reduce the bandwidth required for requesting and transferring software licenses for authorizing application file usage at alternative sites, a set of software licenses is requested when available.

When one of the multiple license servers loses communication with the other license servers, the disconnected license server continues to manage the block of software licenses originally allocated. If the disconnected license server previously borrowed software licenses from one of the other license servers, the disconnected license server continues to manage the borrowed software licenses for a predetermined period of time. After the predetermined time period, if the connection is not reestablished, the borrowing license server reverts back to managing only the originally allocated software licenses and the license server from which the software licenses were borrowed, regains management of the borrowed software licenses.

DETAILED DESCRIPTION

The multi-site software license balancing system summarized above and defined by the enumerated claims may be better understood by referring to the following detailed description, which should be read in conjunction with the accompanying drawings. This detailed description of the preferred embodiment is not intended to limit the enumerated claims, but to serve as a particular example thereof. In addition, the phraseology and terminology employed herein is for the purpose of description, and not of limitation.

A number of software providers license software files under a pricing model wherein a customer purchases the right to concurrently use a predetermined number of copies, referred to as a "floating license". Software files that are sold with "floating licenses" are often delivered with license management software installed on a licensed server, from which users request software licenses. The licensing management software ensures that the customer does not use more licenses than they have purchased and are entitled to use.

Figure 1:
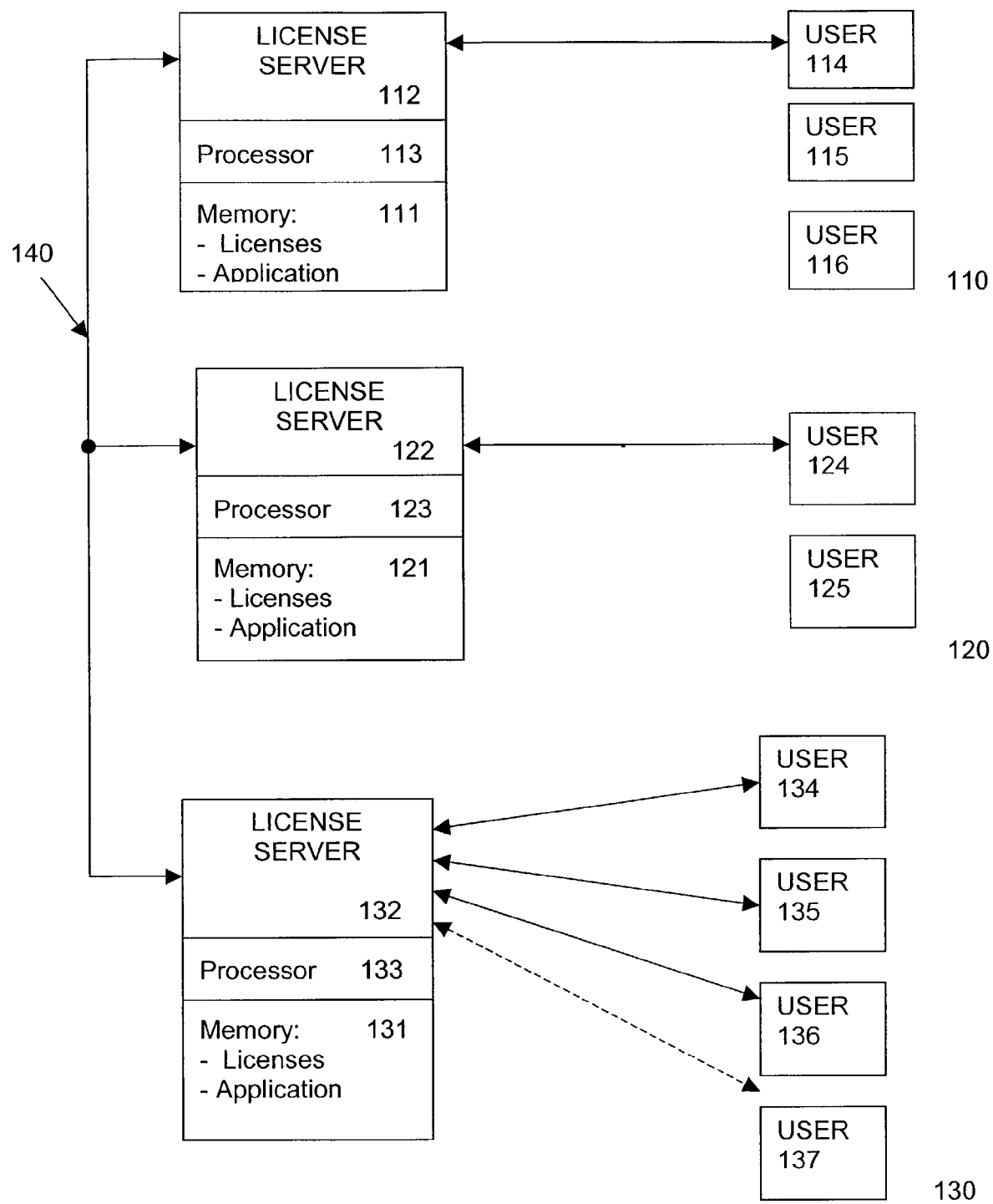
FIG. 1 illustrates a block diagram of a multi-site organization using the present multi-site software license balancing system.

Multi-Site License Balancing Configuration—FIG. 1:

The present multi-site software license balancing system is configured to operate between two or more sites. Referring to the block diagram in FIG. 1, a set of software licenses is shared amongst three sites 110, 120 and 130. Each site includes a license server, 112, 122, and 132, for controlling software license distribution at the particular site. License servers 112, 122, and 132 are linked together via a communication channel 140 such as a wide area network (WAN) for sharing concurrent application file usage allocation and availability data and for transferring software licenses as necessary. The license servers include a processor for executing a software license management application and a memory for storing software licenses allocation and application file usage statistics.

In the example illustrated in FIG. 1, eight licensed copies of the application file are available for concurrent usage by users at three sites 110, 120 and 130. Initially the software licenses are divided into subsets and allocated among the three sites 110, 120 and 130. Each license server 112, 122 and 132 receives application file usage requests from users at the particular site, if a software license is available, the user is authorized a concurrent application file usage allowing the user to access and use the corresponding application file.

Figure 2:
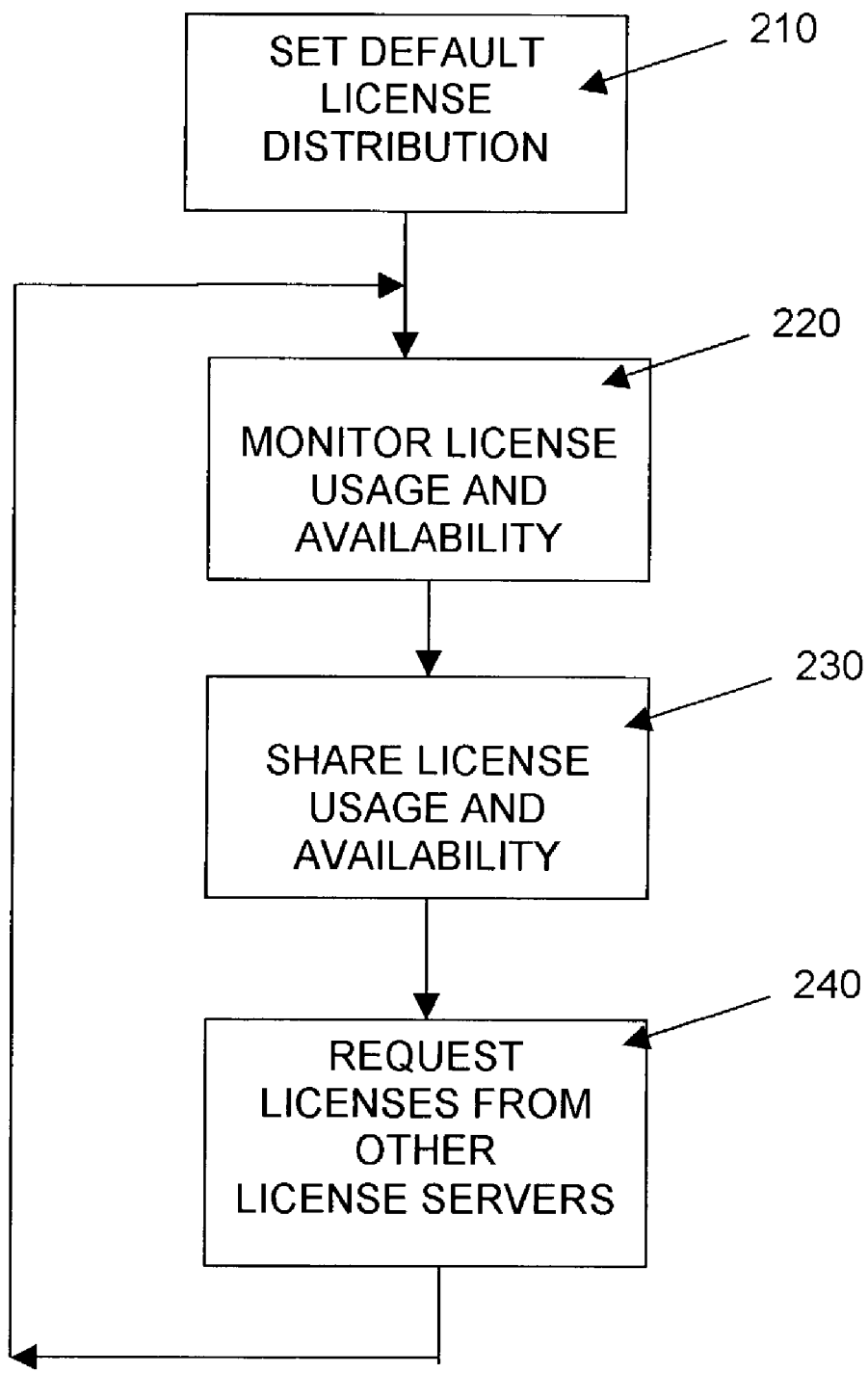
FIG. 2 is a functional flow diagram of the software license balancing system.

Software License Balancing—FIGS. 1 and 2:

Referring to the flow diagram in FIG. 2, in step 210 each license server 112, 122 and 132 are allocated a subset of software licenses and each license server monitors concurrent application file allocation and availability in step 220. Concurrent application file usage and availability data complied in step 220 by each license server 112, 122 and 132 are shared with the other license servers in step 230 where they are stored in memory for use in calculating the percentage of concurrent application file usage of each license server. Sharing of application file usage and availability data at each site in step 230 provides a method for each license server to have knowledge of the number of concurrent application file users authorized and available at each other site. Using the shared application file usage statistics from step 230, the percentage of concurrent application file users for each site is calculated in step 240 by processing devices within each license server. Each server is performing the same calculations using the same statistics, therefore each license server will calculate the same percentage of concurrent application file users for each site. Each license server records the results for future use and makes available a corresponding number of application files in step 260 which will be authorized as application file usage requests are received. Compilation of application file usage statistics by the processing device within each license server over a predetermined period of time provides the statistics required for balancing application file usage in step 250. Once application file usage predictions are calculated in step 250, the number of application files available for use at each site are recalculated in step 260 according to the usage statistics, thus balancing the software license distribution.

For example, if sites 110 and 130 authorize three concurrent users to access and use the application file between the hours of 8 am and 5 pm, sites 110 and 130 each use approximately forty-percent of the available software licenses. Site 120 application file usage during the same time period is one in this example. Therefore the eight software licenses are initially distributed in step 210 with a subset of three software licenses distributed to each site 110 and 130 and the remaining two software licenses are distributed to site 120. In step 270, the license server at each site manages authorization of concurrent usage for that particular site.

Providing a method for compiling and sharing application file usage and availability data between the multiple license servers reduces the time required to request a software license from a central license server and balances the number of concurrent application file users authorized at each particular site based on need. By balancing the number of concurrent application file usage requests authorized at each license server based on usage reduces the need to transfer software licenses between license servers, thus saving time. A multi-site organization using the present multi-site software license balancing system reduces the WAN traffic required by prior art software license distribution systems to request and transfer software licenses for authorizing concurrent usage at each site. Instead, WAN bandwidth is required only for sharing application file authorization and availability data and that data can be schedule for distribution during optimal times.

Figure 3:
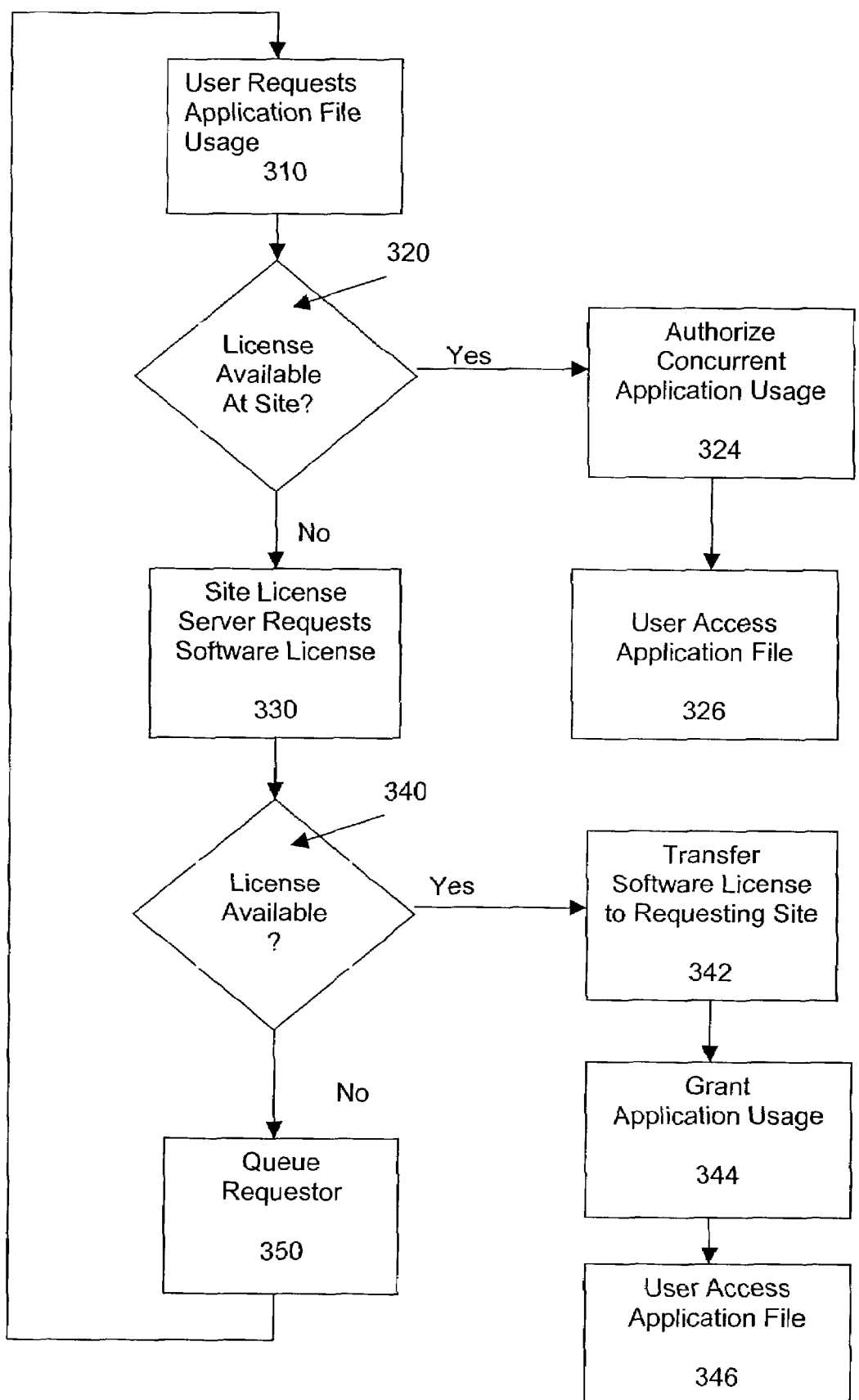
FIG. 3 is an operational flow diagram of the present multi-site software license balancing system.

Operational Characteristics—FIGS. 1, 2 and 3:

Referring to the block diagram in FIG. 1 in conjunction with the operational flow diagram in FIG. 3, license servers 112 and 132 are each initially allocated three software licenses and license server 122 is initially granted two software licenses, wherein each software license allows one user to access and use the corresponding application file. License server 112 receives an application file usage request in step 310 from user 114. When license server 112 receives a license request from user 1 14, the processor 1 13 within license server 112 checks memory 111 for the number of software licenses allocated to the site 110 and the number of application filer users authorized. Since the three allocated software licenses are available, user 114 is authorized in step 324 to access and concurrently use the corresponding application file in step 326. Processor 113 update the number of users authorized to concurrently use the corresponding application file. Likewise, license server 122 authorizes application file usage in step 324 to user 124 while license server 132 authorizes concurrent application file usage in step 324 to the first three users requesting application file usage in step 310, users 134, 135 and 136 in this example. License server 122 has one software license available and license server 112 has two software licenses available while license servers 132 has authorized concurrent application file usage corresponding to the assigned software licenses.

When license server 132 receives application file usage request in step 310 from user 137, license server 132 determines in step 320 whether a software license is available. If a software license is not available in step 320, license server 132 request a software license from an alternative license server in step 330. Based on the shared concurrent application file usage and availability statistics from the other license servers, license server 132 is aware that license server 112 has two software licenses available while license server 122 has one software license available. License server 132 requests one software license from license server 112. License server 112 grants the software license file request to requesting license server 132 in step 342. When the software license request is granted, license server 112 decrements the number of software licenses available while license server 132 increments the number of software licenses available, thus balancing the number of software licenses available at each site based on application file usage. The additional software license allows license server 132 to authorize concurrent usage to user 137 in step 344, allowing user 137 to access and use the corresponding application file in step 346. In the event that there is not a software license available at the three sites 110, 120 and 130, the application file usage requester, user 137 in this example, is queued to use the next available concurrent application file from any one of the three sites 110, 120 or 130.

In an alternative embodiment, license server 132 requests one or more software licenses from an alternative license server prior to receiving an application file usage request from user 137. In this embodiment, a software license is available in step 320 when user 137 requests the application file usage, thus eliminating the time required for license server 132 to request and receive a software license from the alternative license server. Requesting one available software license from license server 112 balances the number of software licenses available at each of the three license servers. As additional users request application file usage or discontinue concurrent application file usage at each site, the allocated and available software licenses are balanced by transferring software licenses between the sites. For example, when the number of software licenses available at one or more sites begins to fall below a predetermined level the license server is over utilized. The over utilized license server will request some number of software licenses from an underutilized license server having spare software licenses available. When one or more software licenses are transferred to an over utilized license server, the borrowed software licenses remain with the requesting license server until another over utilized license server requests one or more of the borrowed software licenses.

In the event that there is not a software license available at the three sites 110, 120 and 130, the application file usage requester, user 137 in this example, is queued for authorization to concurrently use the application file when a software license is available from any one of the three sites 110, 120 or 130. In this example, license server requested a software license from license servers 112 and 122. The requests were denied since license servers 112 and 122 have granted concurrent use of the software licenses available for their particular site. The request remains active at each license server 112, 122 and 132 until a user terminates use of an application file, at which time the request from license server 132 is granted.

Referring to FIG. 2, the application file usage for each site is compiled by the site license server in step 220 and shared with the other license servers in step 230. The software licenses are balanced in step 250 in response to a request from an over utilized license server for additional software licenses, thus balancing the number of software licenses available at each site. The multiple license servers continue to share application file usage and software license availability data to determine which license server to request a software licenses from in the event the number of concurrent application file users at one site decreases while the number of concurrent application file users at another site increases.

Figure 4:
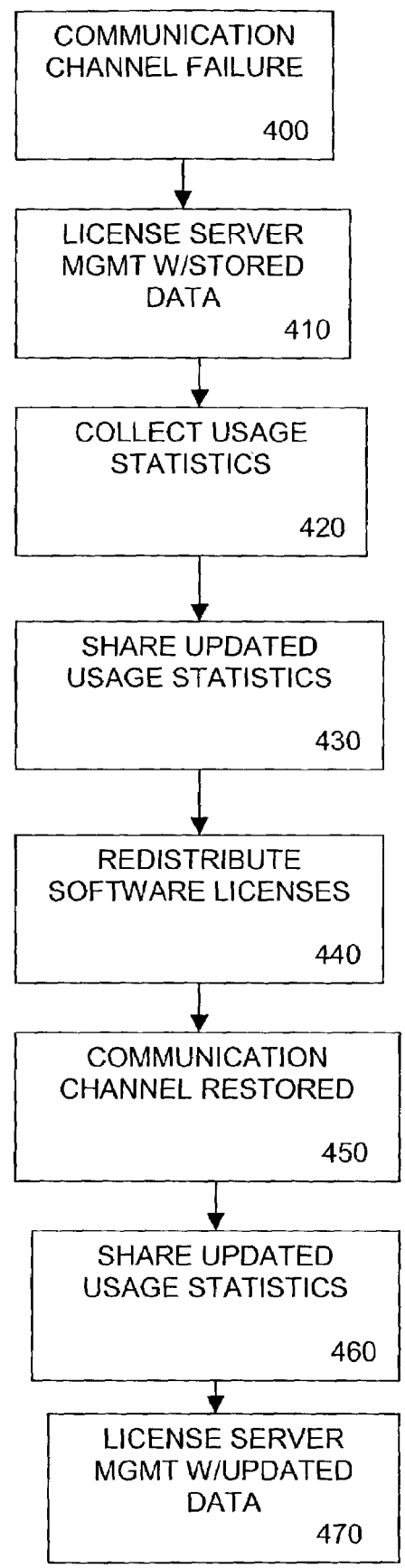
FIG. 4 is an operational block diagram of an embodiment of the present multi-site software license balancing system.
Figure 5:
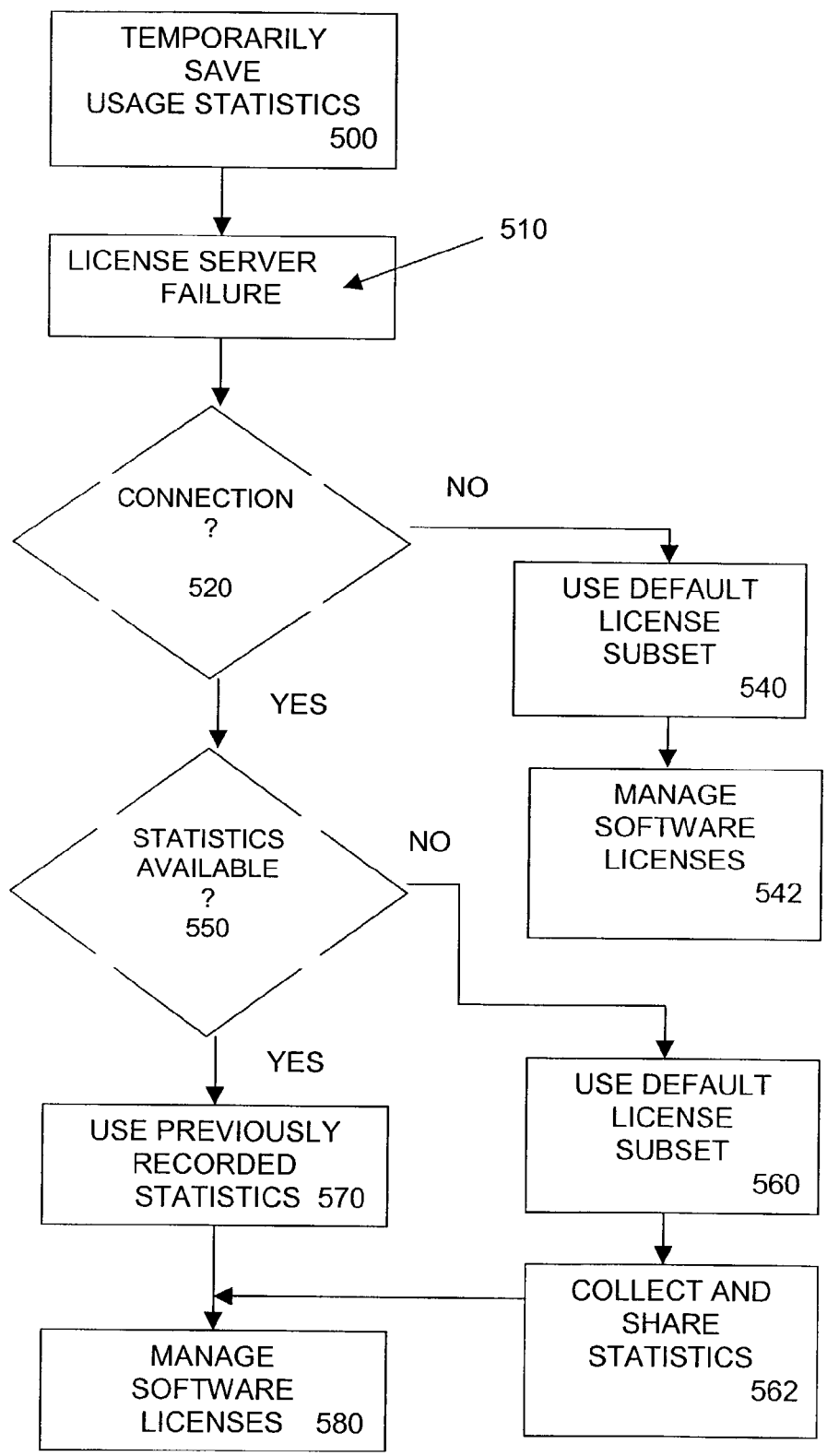
FIG. 5 is an operational block diagram of an embodiment of the present multi-site software license balancing system.

Failure Mode—FIGS. 1 and 4-5:

Failure of the communication channel in step 400 between one license server and the other license servers does not prevent each license server from managing the software licenses allocated to that particular site in step 410. Instead, the disconnected license server continues to manage application file usage requests in step 410 based on the number of software licenses allocated and available at that particular site. Likewise, the other two license servers manage application file usage requests in step 410 at their particular site based on previously allocated and available software licenses. However, the connected license servers continue to collect and share application file usage statistics in steps 420 and 430, and continue to transfer software licenses between the connected license servers in response to a request from an over utilized license server, thus balancing the distribution of software licenses between the connected license servers. After a predetermined time period, the software licenses previously transferred to the disconnected license servers become invalid at the disconnected license server as concurrent application file usage is discontinued. The software licenses are added to the number of allocated software licenses at the under utilized license server which transferred the software licenses to the disconnected license server. Invalidating software licenses at the disconnected site eliminates the possibility that a disconnected license server will retain control of all of the software licenses, thus balancing the number of software licenses allocated to each license server.

Referring to the operation flow diagram in FIG. 5, software license allocation and initial application file usage data is temporarily saved on the each license server in step 500. They are not permanently saved on the license server to eliminate the susceptibility of tampering with the statistics or predictions. Therefore, complete failure of a license server in step 510 results in stored application file usage statistics and predictions being lost. When a license server fails in step 510 the temporarily stored application file usage statistics are lost. When the failed license server reinitializes, connection with the other license servers is established in step 520. If application file usage and software license availability data is available from another license server, the previously failed license server retrieves the application file usage statistics in step 550 and operation between the license servers proceeds as usual in step 580. However, if the previously failed license server is unable to reestablish connection with the other license servers in step 520, the previously failed license server reverts back to the default software license allocation in step 540. Thus, regardless of the status of reconnection with the other license servers, the previously failed license server manages the allocated software licenses in step 542 until connection is reestablished. Unlike prior art software license management systems, providing a method for license servers that are not able to communicate with other license servers to continues to manage an allocation of software licenses prevents more than one site from granting the total number of software licenses. It also provides a method for each license server to continue managing application file usage requests at each corresponding site.

If application file usage statistics are not available in step 550 from another license server after the communication channel is restored in step 520, the previously failed license server manages the default software license subset in step 560 and collects and shares updated application file usage statistics in step 562.

A catastrophic failure of all of the license servers simultaneously would result in each license server initializing with the default subset of software licenses. Each license server would collect and share new application file usage statistics as previously discussed. In an alternative embodiment, the usage statistics are periodically sent to an alternative remote storage device. In this embodiment, if all of the license servers fail simultaneously, the first license server reinitialized recovers the previously saved usage statistics from the remote storage device. As the other license servers reinitialize, the other license servers recover usage statistics from the first license server and operation presumes.

As to alternative embodiments, those skilled in the art will appreciate that the present multi-site software license balancing system can be configured with an alternative number of sites, license servers and available licenses. It is also anticipated that the license servers receive and process application file usage requests for more than one application file type and that the allocation and availability data for each application file type be tracked and allocated independent of the other application file types.

It is apparent that there has been described, a multi-site software license balancing system that fully satisfies the objects, aims, and advantages set forth above. While the multi-site software license balancing system has been described in conjunction with specific embodiments thereof, it is evident that many alternatives, modifications, and/or variations can be devised by those skilled in the art in light of the foregoing description. Accordingly, this description is intended to embrace all such alternatives, modifications and variations as fall within the spirit and scope of the appended claims.

What is claimed is:

1. A method for distributing a plurality of software licenses corresponding to a plurality of application files to a plurality of license controllers which are interconnected via a communication channel, wherein each of the license controllers is located at a corresponding site where they receive usage requests from a plurality of users, the method comprising:

allocating a default subset of the plurality of software licenses to each of said license controllers; and each of said license controllers authorizing usage of an application file corresponding to one of said software licenses comprising:

processing a usage request received from a user;

authorizing usage of a corresponding application file when the number of software licenses presently authorized is less than the number of software licenses allocated to this license controller; and balancing the number of software licenses allocated to each of said license controllers, comprising:

calculating, in each of said license controllers, an application file usage statistic;

distributing the application file usage statistic among said license controllers; and reallocating the plurality of software licenses among said license controllers according to said application file usage statistics distributed among said license controllers.

2. The method for distributing a plurality of software licenses of claim 1 wherein said step of authorizing usage further comprises:

requesting, in response to the number of software licenses presently authorized being equal to the number of software licenses allocated to this license controller, one of the said software licenses from another one of said license controllers; and authorizing, in response to one of said software licenses being available from another one of said license controllers, usage of an application file corresponding to the available software license, comprising:

transferring one of said software licenses to the requesting one of said license controllers;

authorizing usage of the application file corresponding to the transferred one of said software licenses; and adjusting the number of software licenses allocated to each of said license controllers to reflect redistribution of said software licenses.

3. The method for distributing a plurality of software licenses of claim 2 further comprising:

queuing, in response to one of said software licenses not being available, application file usage requests; and authorizing, in response to one of said software licenses becoming available at one of said license controllers, the usage of the corresponding application file.

4. The method for distributing a plurality of software licenses of claim 1 wherein the method, in response to failure of said communication channel, further comprises:

authorizing, in the disconnected one of said license controllers, usage of application files based on the default subset of the software licenses; and authorizing, in the remaining connected license controllers, usage of application files based on the updated application file usage, the authorization comprising:

calculating an updated application file usage statistic based on the number of application file requests authorized by the connected license controllers; and redistributing the plurality of software licenses based on the updated application file usage statistics and the default subset of the application files corresponding to the disconnected one of said license controllers.

5. The method for distributing a plurality of software licenses of claim 1 wherein the software distribution system further comprises a storage device interconnected to said license controllers, the method further comprising:

storing said application file usage statistics from said license controllers on the storage device;

retrieving, in response to reinitialization of said license controllers, the application file usage statistics from the storage device; and allocating said software licenses according to the retrieved application file usage statistics.

* * * * *